Sept. 29, 1936.   L. W. BOSLEY   2,055,646
PROTECTOR FOR INTERNAL THREADS
Filed Oct. 17, 1934
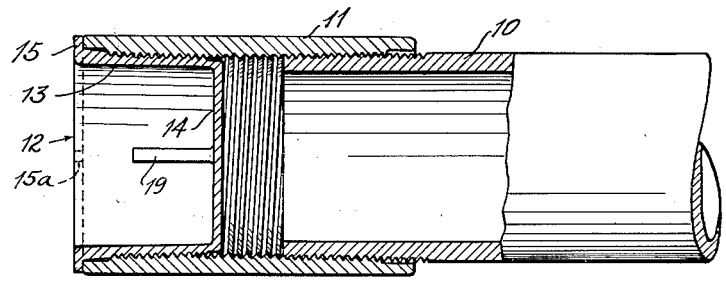
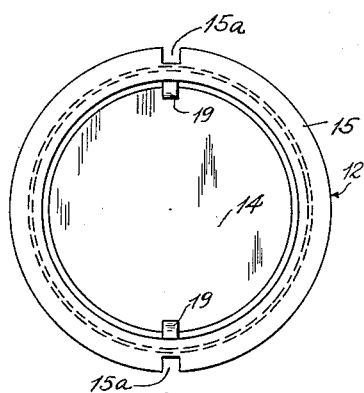
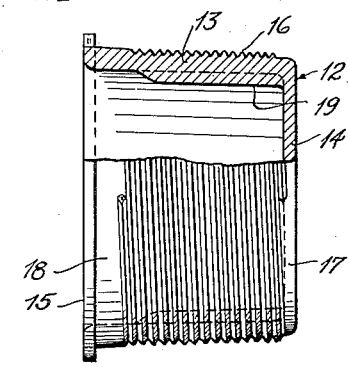
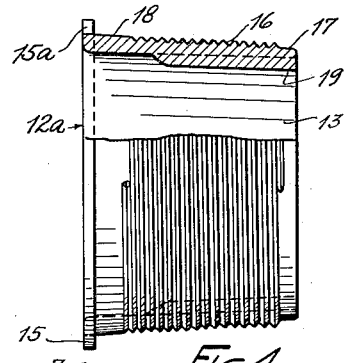
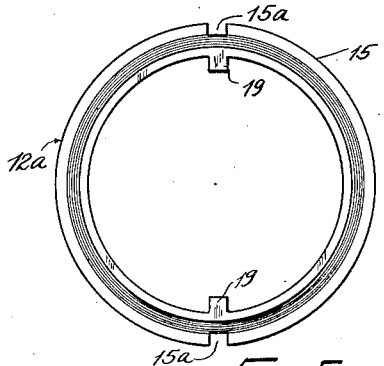
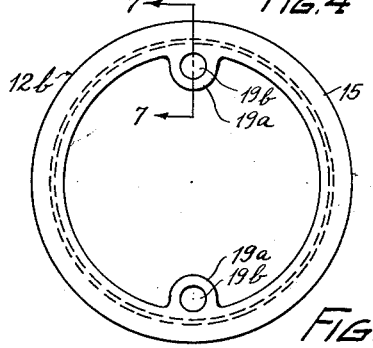
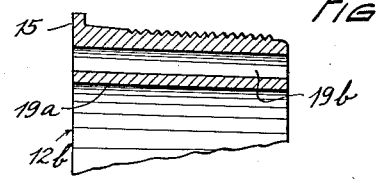
INVENTOR.
LEWIS W. BOSLEY
BY
Kwis, Hudson + Kent
ATTORNEYS Patented Sept. 29, 1936

2,055,646

UNITED STATES PATENT OFFICE 2,055,646

PROTECTOR FOR INTERNAL THREADS

Lewis W. Bosley, East Cleveland, Ohio, assignor to The Cleveland Hardware & Forging Company, Cleveland, Ohio, a corporation of Ohio Application October 17, 1934, Serial No. 748,688

4 Claims. (Cl. 138—96)

This invention relates to inside thread protectors for internally threaded members, such as pipe couplings and the like.

External pipe thread protectors are commonly used, but, so far as I am aware, no inside thread protectors which are economical in manufacture and satisfactory in application and results have been provided.

The object of the present invention is to provide a satisfactory inside or internal thread protector which can be produced inexpensively, which can be screwed into and unscrewed from a pipe coupling, and which, when screwed therein, serves to protect the threads of the coupling as well as to form a tight closure and a virtual seal therefor.

Several slightly different embodiments of the invention are illustrated in the drawing, wherein:

Fig. 1 is a view showing a short section of pipe with a coupling screwed thereon and with the thread protector screwed into the exposed end of the coupling;

Fig. 2 is a detached side view of my improved inside thread protector with a portion in section;

Fig. 3 is an end view looking toward the larger end of the protector;

Fig. 4 is a view similar to Fig. 2, showing a modified form of protector with the inner end thereof open;

Fig. 5 is an end view looking toward the smaller end of the protector shown in Fig. 4;

Fig. 6 is a view similar to Figs. 3 and 5, showing a further slight modification; and Fig. 7 is a fragmentary sectional view substantially along the line 7—7 of Fig. 6.

Pipes such as used in oil fields and the like are, of course, externally threaded at both ends, and when these pipes are shipped from the manufacturer, a coupling is screwed onto one end of the pipe so that in the field the pipe sections can be readily joined into a fluid or gas supply pipe line.

In the drawing, 10 represents one of the pipe sections, and 11 shows conventionally one of the couplings. My improved inside thread protector finds its principal use for insertion in the outer or projecting end of a coupling 11, and the manner in which it is used is illustrated in Fig. 1.

It is a feature of the present invention that my improved inside thread protector is a die casting, the material employed being preferably zinc, although other materials, such as aluminum, might be used for casting the protector. In the preferred embodiment, the protector is in the form of a cup 12 having a tapered annular body portion 13 with its inner end closed as shown at 14 and with an external flange 15 at its outer end which is adapted to abut against the end of the coupling when the protector is screwed the full distance therein, as shown in Fig. 1. The outer tapered surface of the body portion 13 of the protector has cast thereon a thread 16 which of course matches the thread of the coupling or other part into which the protector is to be screwed.

It is also a feature of the invention that the inner end of the thread 16 is terminated short of the small or inner end of the protector, leaving beyond the thread an unthreaded portion 17. Likewise, the outer end of the thread is terminated short of the flange 15, leaving an unthreaded portion 18 at this point. The ending of the thread, both at its inner and outer ends, short of the ends of the protector has the advantage that the extreme ends of the threads are better protected than would be the case if the threads came clear to the ends of the protector. For example, if the thread extended to the inner end of the protector, it could be and frequently would be battered over, which would make it very difficult to screw the protector into the coupling. The unthreaded portion 18 between the outer end of the thread and the flange is the full height of the thread and preferably extends from the thread to the flange 15 with a somewhat steeper taper than the taper of the threaded part so as to fit fairly closely in the outer end of the coupling which is usually slightly counterbored.

Inside the cup I prefer to provide ribs 19 which extend from the closed inner end toward but not entirely to the outer end of the protector. These ribs perform a double function. They serve as strengthening ribs and permit the protector to be made somewhat thinner than would otherwise be the case, and, additionally, they act as shoulders to be engaged by a tool inserted into the protector when it is desired to unscrew the protector from the coupling. Two oppositely disposed ribs 19 are thought to be sufficient for the two purposes mentioned, but more than two may be employed if desired, as, for example, four ribs arranged 90° apart. I prefer also to provide in the flange 15 a pair of oppositely disposed notches 15a for the purpose of accommodating a spanner wrench.

In Figs. 4 and 5, I have shown at 12a a protector which is identical with that first described except that, instead of closing the inner end of the protector and forming it in the shape of a cup, it is open-ended or in the form of a sleeve.

As it is otherwise identical with the protector first described, the same reference characters as applied to the form shown in Figs. 1 to 3 will be here used to indicate the details of the protector.

The protector 12b shown in Figs. 6 and 7 is similar to that shown in Figs. 4 and 5, except that the internal ribs, here designated 19a, extend from one end of the protector to the other, and, instead of notching the flange 15 to accommodate a spanner wrench, the ribs are provided with openings 19b for this purpose.

Thus it will be seen that I have provided an inside thread protector, either in the form of an open-ended sleeve or in the form of a cup with its small inner end closed so as to form a closure as well as a thread protector for the coupling; that the whole protector is cast with the thread on its outer tapered wall terminating short of the smaller inner end and preferably short of both ends of the annular wall of the sleeve or cup, and that at its outer end the protector has a flange which abuts against the end of the coupling when the protector is screwed home; that the coupling has internal ribs cast therein serving to strengthen the coupling and allow it to be formed with a thinner wall than would otherwise be the case, and also serving as a means for the insertion of a suitable instrument in the protector to screw it tightly in the coupling and to unscrew it therefrom; and that the protector has provision in the flange or in the ribs themselves for receiving a spanner wrench to apply or remove the protector.

While I have shown and described in some detail the preferred forms of the invention, I do not desire to be confined to the precise details illustrated, but aim in my claims to cover all modifications which do not involve a departure from the spirit and scope of the invention.

Having thus described my invention, I claim:

1. A thread protector and closure for internally threaded pipe couplings and the like comprising a cast metal cup-shaped member having a tapered annular wall closed at its smaller end and having a cast thread on its outer surface and unthreaded portions beyond the threaded portion, the unthreaded portion at the smaller end of the member lying within the outer surface of the thread and the unthreaded portion at the other end of the member extending outwardly beyond the outer surface of the thread, said cup-shaped member having at its larger end a laterally extending flange and having ribs cast on the inner surface of the annular wall which reenforce said member and provide lugs for rotating the same.

2. A thread protector for internally threaded pipe couplings and the like comprising a cast metal member having a tapered annular wall with a cast thread on its outer surface and at its smaller end having an unthreaded portion lying within the outer surface of the thread and at its larger end having an unthreaded portion extending outwardly beyond the outer surface of the thread, said member having ribs cast on the inner surface of the annular wall to reenforce said member and providing lugs for rotating the same.

3. A thread protector for internally threaded pipe couplings and the like comprising a cast metal cup-shaped member having a tapered annular wall closed at its smaller end and provided with a cast thread on its outer surface, there being at the smaller end an unthreaded portion lying within the outer surface of the thread and there being at the larger end an unthreaded portion extending outwardly beyond the outer surface of the thread, said member having ribs cast on the inner surface of the annular wall to reenforce said member and providing lugs for rotating the same.

4. A thread protector for internally threaded pipe couplings and the like comprising a cast metal member having a tapered annular wall with a cast thread on its outer surface, there being at the smaller end an unthreaded portion lying within the outer surface of the thread and there being at the larger end a laterally projecting flange and between said flange and the thread an unthreaded portion extending outwardly beyond the outer surface of the thread, said member having ribs cast on the inner surface of the annular wall to reenforce said member and to provide lugs for rotating the same.

LEWIS W. BOSLEY.